(12) United States Patent
Childers et al.

(10) Patent No.: US 9,784,862 B2
(45) Date of Patent: Oct. 10, 2017

(54) DISTRIBUTED DOWNHOLE ACOUSTING SENSING

(71) Applicants: Brooks A. Childers, Christiansburg, VA (US); Roger Glen Duncan, Christiansburg, VA (US); Michael C. Nuckels, Blacksburg, VA (US)

(72) Inventors: Brooks A. Childers, Christiansburg, VA (US); Roger Glen Duncan, Christiansburg, VA (US); Michael C. Nuckels, Blacksburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1060 days.

(21) Appl. No.: 13/690,324

(22) Filed: Nov. 30, 2012

(65) Prior Publication Data

US 2014/0150548 A1    Jun. 5, 2014

(51) Int. Cl.
| | | |
|---|---|---|
| *E21B 47/00* | (2012.01) | |
| *G01V 1/22* | (2006.01) | |
| *G01V 1/40* | (2006.01) | |

(52) U.S. Cl.
CPC ............ *G01V 1/226* (2013.01); *G01V 1/40* (2013.01)

(58) Field of Classification Search
CPC ............ G01V 1/226; G01V 1/40; G01B 9/02
USPC ......... 73/152.01, 152.46, 152.54; 340/853.1, 340/854.5, 853.2, 870.01; 367/81, 35, 86, 367/87, 911, 25; 342/50; 356/73.1, 460, 356/450, 477
See application file for complete search history.

(56) References Cited

U.S. PATENT DOCUMENTS

| | | | | |
|---|---|---|---|---|
| 5,555,220 A | * | 9/1996 | Minto | G01V 1/42 166/250.01 |
| 5,987,197 A | * | 11/1999 | Kersey | 385/24 |
| 6,268,911 B1 | | 7/2001 | Tubel et al. | |
| 6,285,446 B1 | | 9/2001 | Farhadiroushan | |
| 6,442,304 B1 | * | 8/2002 | Crawley et al. | 385/12 |
| 6,601,671 B1 | * | 8/2003 | Zhao et al. | 181/108 |
| 7,894,061 B2 | * | 2/2011 | MacDougall et al. | 356/369 |
| 2002/0196993 A1 | * | 12/2002 | Schroeder | 385/12 |

(Continued)

FOREIGN PATENT DOCUMENTS

| | | | | |
|---|---|---|---|---|
| CA | 2823307 A1 | | 7/2012 | |
| CA | 2827713 A1 | | 9/2012 | |
| GB | WO2011/067554 | * | 6/2011 | G01M 11/3109 |

OTHER PUBLICATIONS

Abdi et al., Theoretical suppression of cavity interferences in a fiber Bragg grating array interrogated with coherent optical frequency domain reflectometry, Aug. 24, 2006, Institute of Physics Publishing, Abstract, p. 1296.*

(Continued)

*Primary Examiner* — John Fitzgerald
*Assistant Examiner* — Truong D Phan
(74) *Attorney, Agent, or Firm* — Cantor Colburn LLP (57) ABSTRACT

A method and system to perform distributed downhole acoustic sensing in a borehole are described. The system includes an optical fiber comprising at least one reflector, and a tunable laser configured to perform a transmission of a range of wavelengths through the optical fiber. The system also includes a receiver configured to receive an interferometer signal resulting from the transmission, and a processor configured to determine a component of the interferometer signal.

19 Claims, 7 Drawing Sheets

(56) References Cited

U.S. PATENT DOCUMENTS

| | | | |
|---|---|---|---|
| 2006/0126073 A1 | 6/2006 | Farrell et al. | |
| 2007/0047867 A1* | 3/2007 | Goldner | 385/12 |
| 2007/0051882 A1 | 3/2007 | Childers | |
| 2008/0297772 A1 | 12/2008 | Rogers et al. | |
| 2009/0046276 A1* | 2/2009 | Moore | G02B 6/2932 356/73.1 |
| 2009/0114386 A1* | 5/2009 | Hartog et al. | 166/250.08 |
| 2009/0254280 A1* | 10/2009 | Stoesz | E21B 49/006 702/6 |
| 2010/0038079 A1* | 2/2010 | Greenaway | 166/254.2 |
| 2011/0002795 A1* | 1/2011 | Brookbank | F04B 47/06 417/63 |
| 2011/0110621 A1* | 5/2011 | Duncan et al. | 385/13 |
| 2011/0181871 A1* | 7/2011 | Childers | G01D 5/35316 356/73.1 |
| 2011/0292763 A1* | 12/2011 | Coates et al. | 367/25 |
| 2012/0046866 A1* | 2/2012 | Meyer | E21B 28/00 702/6 |
| 2012/0067118 A1* | 3/2012 | Hartog | E21B 41/00 73/152.16 |
| 2012/0278043 A1* | 11/2012 | Lewis | G01D 1/00 702/189 |
| 2013/0021615 A1* | 1/2013 | Duncan et al. | 356/477 |
| 2013/0026882 A1* | 1/2013 | Yamada | H01L 41/1132 310/313 D |
| 2014/0126332 A1* | 5/2014 | Skinner | 367/82 |

OTHER PUBLICATIONS

Cox et al., "Distributed Acoustic Sensing for Geophysical Measurement, Monitoring and Verification", Luncheon, CSEG Recorder, Feb. 2012, pp. 1-6.

Eisler et al., "Fiber Optic Leak Detection Systems for Subsea Pipelines", Offshore Technology Conference, OTC 23070, 2012, pp. 1-13.

Koelman et al., "Optical Fibers: The Neurons for Future Intelligent Wells", Society of Petroleum Engineers, SPE 150203, 2012, pp. 1-8.

Koelman et al., "Fiber Optic Technology for Reservoir Surveillance" International Petroleum Technology Conference, 2011, pp. 1-10.

Molenaar et al., "First Downhole Application of Distributed Acoustic Sensing for Hydraulic-Fracturing Monitoring and Diagnostics" SPE Drilling & Completion, Mar. 2012, pp. 32-38.

Statoil et al., "Distributed Acoustic Sensing—A New Way of Listening to Your Well/Reservoir", Society of Petroleum Engineers, SPED 149602, 2012, pp. 1-9.

Canadian Office Action for CA Application No. 2,892,374, dated Jun. 28, 2016, pp. 1-5.

Extended European Search Report for EP Application No. 13858894.2-1559, dated Jul. 11, 2016, pp. 1-7.

International Search Report and Written Opinion for PCT Application No. PCT/US2013/067252, dated Feb. 17, 2014, pp. 1-13.

* cited by examiner

DISTRIBUTED DOWNHOLE ACOUSTING SENSING

BACKGROUND

In downhole exploration and geologic resource recovery efforts, the ability to obtain information about the conditions of the environment and the status of the equipment downhole can be helpful in making decisions. For example, information indicating imminent failure of equipment may lead to actions that mitigate costly consequences of the failure. Many sensors and measurement devices (e.g., temperature and pressure sensors) are currently used downhole. Additional monitoring and measurement techniques would be appreciated by the drilling industry.

SUMMARY

According to one aspect of the invention, a system to perform distributed downhole acoustic sensing in a borehole includes an optical fiber comprising at least one reflector; a tunable laser configured to perform a transmission of a range of wavelengths through the optical fiber; a receiver configured to receive an interferometer signal resulting from the transmission; and a processor configured to determine a component of the interferometer signal.

According to another aspect of the invention, a method of performing distributed downhole acoustic sensing in a borehole includes arranging an interferometer in the borehole, the interferometer coupled to a component of interest; obtaining an interferometer signal from the interferometer; and processing the interferometer signal to determine information regarding the component of interest.

BRIEF DESCRIPTION OF THE DRAWINGS

Referring now to the drawings wherein like elements are numbered alike in the several Figures.

DETAILED DESCRIPTION

High frequency acoustic signals (e.g., from machine vibrations, flow) can provide valuable information about the status of the borehole and of machinery in the borehole. Embodiments of the invention described herein relate to measuring distributed acoustic signals to not only detect but also localize desired information.

Figure 1:
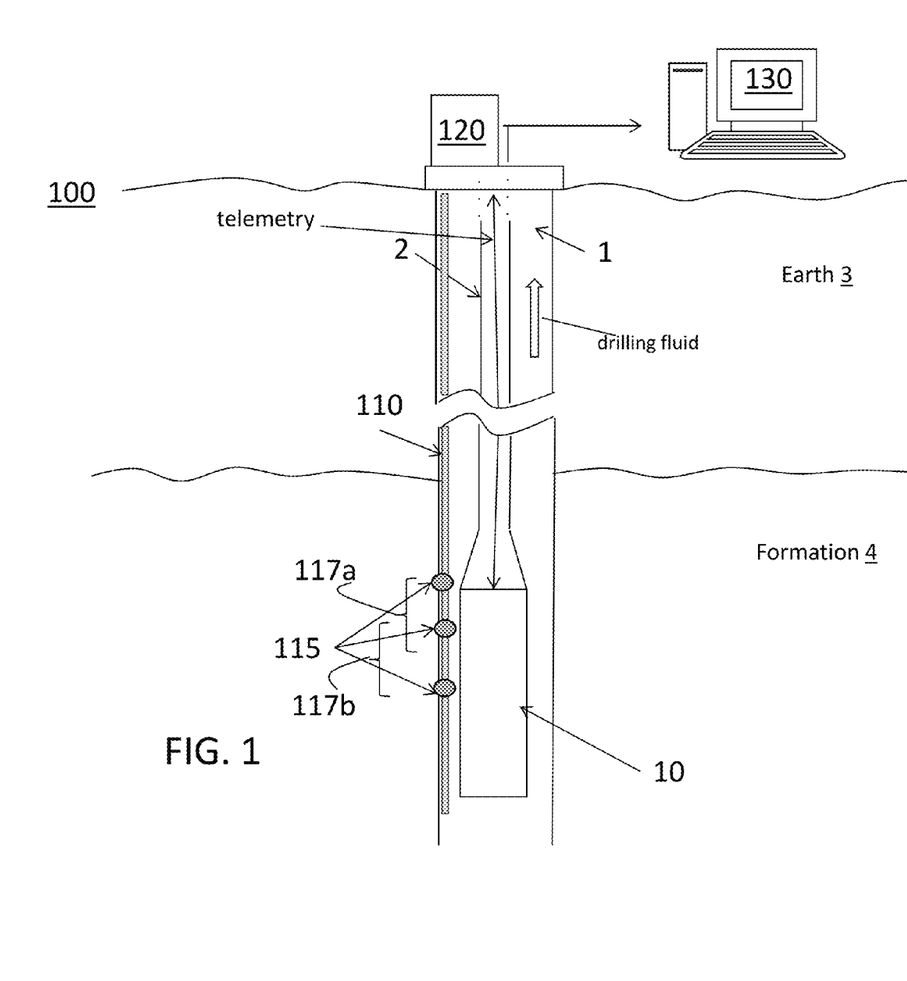
FIG. 1 is a cross-sectional illustration of a borehole including a distributed acoustic sensor system according to an embodiment of the invention.

FIG. 1 is a cross-sectional illustration of a borehole 1 including a distributed acoustic sensor system 100 according to an embodiment of the invention. A borehole 1 penetrates the earth 3 including a formation 4. A set of tools 10 may be lowered into the borehole 1 by a string 2. In embodiments of the invention, the string 2 may be a casing string, production string, an armored wireline, a slickline, coiled tubing, or a work string. In measure-while-drilling (MWD) embodiments, the string 2 may be a drill string, and a drill would be included below the tools 10. Information from the sensors and measurement devices included in the set of tools 10 may be sent to the surface for processing by the surface processing system 130 via a fiber link or telemetry. The distributed acoustic sensor system 100 includes an optical fiber 110. In the embodiment shown in FIG. 1, the optical fiber 110 includes point reflectors 115. As indicated in FIG. 1, the three exemplary point reflectors 115 make up two interferometers 117a and 117b. The distributed acoustic sensor system 100 also includes a tunable laser 120, shown at the surface of the earth 3 in FIG. 1.

Figure 2:
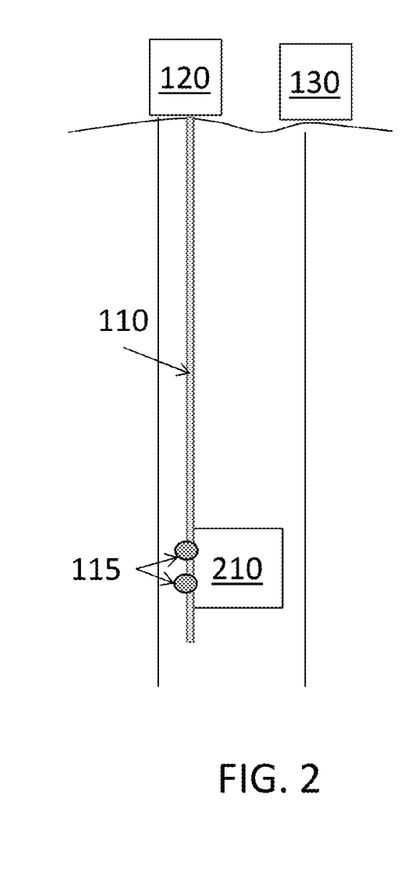
FIG. 2 details one embodiment is which a distributed acoustic sensor system is used to monitor machinery.

FIG. 2 details one embodiment in which the distributed acoustic sensor system 100 is used to monitor machinery 210. The machinery may be, for example, a submersible pump. In the embodiment shown in FIG. 2, the optical fiber 110 has point reflectors 115 on it that are coupled to the machinery 210. Each set of the point reflectors 115 shown in FIG. 2 are, for example, 10-20 cm apart and comprise a Fabry-Perot interferometer. In alternate embodiments, the interferometer 117 may be a Michelson interferometer or a Mach-Zehnder interferometer rather than a Fabry-Perot interferometer. Each interferometer 117 comprised of a set of the point reflectors 115 in the present embodiment monitors the machinery 210 in the following way. The tunable laser 120 emits a range of sequential wavelengths over some finite time interval. The return signals from a pair of the point reflectors 115, with no other contributing component, would interfere with each other to generate a sine wave pattern whose frequency reflects the spacing of the point reflectors 115 (i.e. each interferometer 117 output would be a sine wave pattern). In a real world scenario, the signal received at the surface from each interferometer 117 comprised of a set of the point reflectors 115 will not be a pure sine wave pattern but will, instead, include other signal components contributed by the vibration of the machinery 210 to which the point reflectors 115 are coupled, as well as signal components due to non-linear tuning of the tunable laser 120. Embodiments using a tunable laser 120 with a linear tuning characteristic avoid these contributing signal components. Thus, by knowing the spacing between the point reflectors 115 in an interferometer 117, the surface processing system 130 can determine the interference component or the component of acoustic signal attributable to the machinery 210 to which the point reflectors 115 are coupled. That is, with the sine wave as a carrier, the phase shift caused by the machinery 210 vibration can be thought of as a modulation of the carrier, and the modulation can be processed and determined as detailed below. Over time, by monitoring this vibration component of the machinery 210, changes (e.g., an increase in vibration) can be determined and dealt with. For example, if a rapid increase in the vibrational component of the machinery 210 is determined, it may indicate an imminent failure in the machinery 210.

Figure 3:
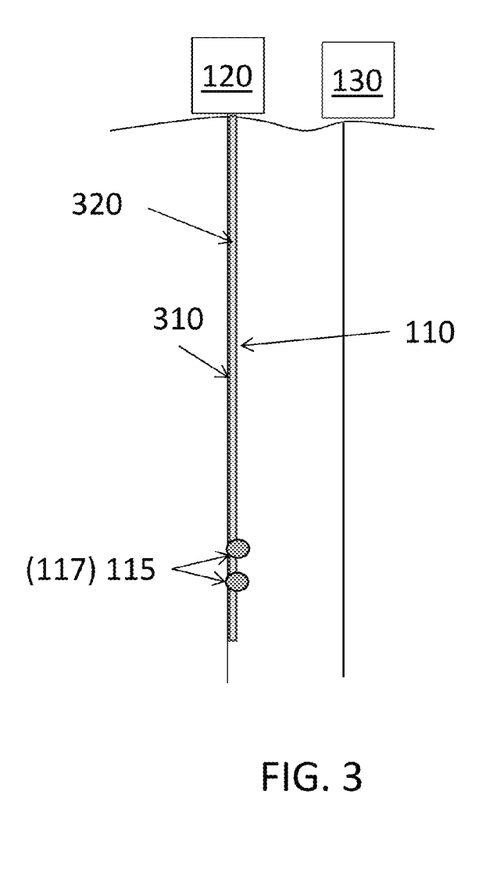
FIG. 3 details one embodiment in which a distributed acoustic sensor system is used to monitor a sandscreen.

FIG. 3 details one embodiment of using the distributed acoustic sensor system 100 to monitor a sandscreen 310. The optical fiber 110 may be directly coupled to the sandscreen 310 or may be coupled to the sandscreen 310 through another component 320 (e.g., Fiber Express Tube™). The tunable laser 120 sweeps a range of wavelengths over a time interval as in the embodiment discussed with reference to FIG. 2. The resulting interferometer signal (where the interferometer 117 is comprised of the pair of the point reflectors 115 in the embodiment shown in FIG. 3) includes a component due to flow through the sandscreen 310. That is, just as vibration of the machinery 210 modulated the sine pattern generated by a reflection of the tunable laser 120 output by the point reflectors 115 in the embodiment shown in FIG. 2, flow of formation fluid through the sandscreen 310 modulates the sine pattern and can be processed and detected by the surface processing system 130. For example, a pipe the length of 100 feet may cover a reservoir. By using the distributed acoustic sensor system 100, the flow of oil can be localized along the pipe. The processing of the interferometer signal to determine the component attributable to the disturbance (e.g., vibration, flow) according to the embodiments shown in FIGS. 2 and 3 is detailed next.

Figure 4:
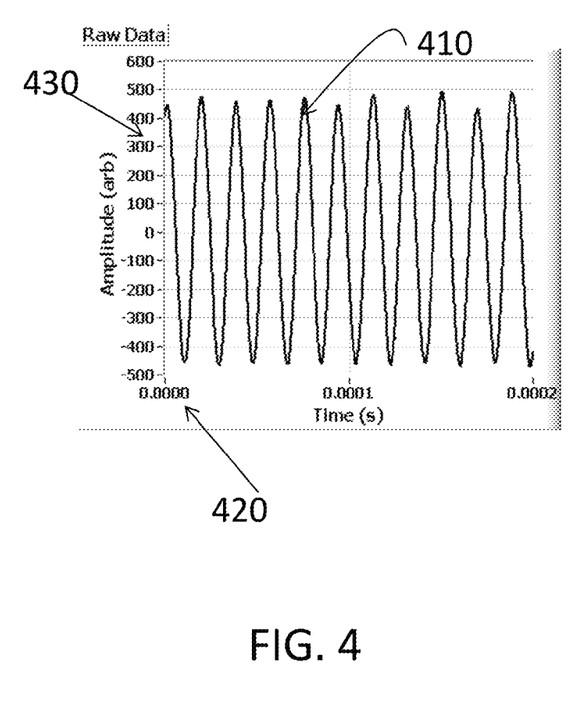
FIGS. 4 to 8 relate to the processing performed on interferometer output according to embodiments of the invention.
Figure 5:
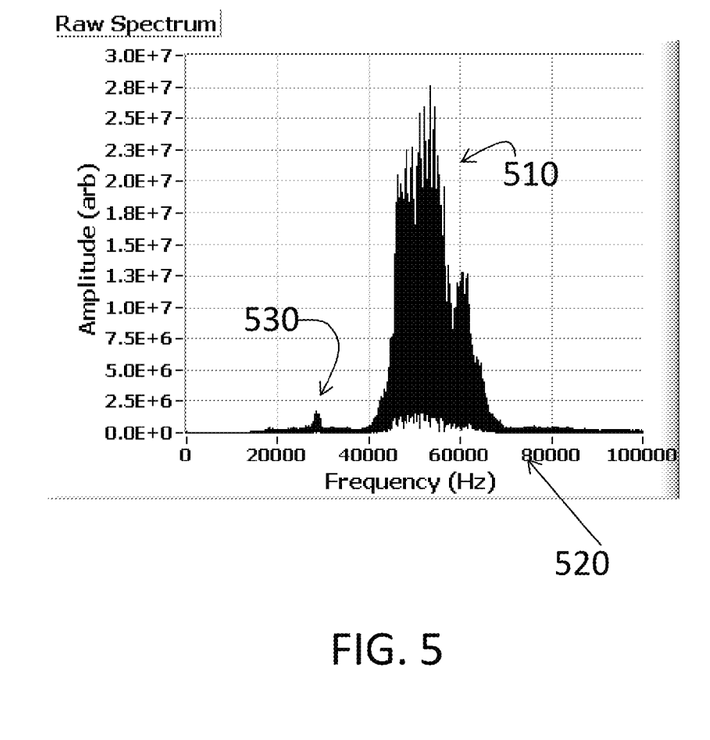

FIGS. 4-8 detail the processing of an exemplary interferometer signal received by the distributed acoustic sensor system 100. The processing may be executed by the surface processing system 130, for example. FIG. 4 shows an exemplary received signal 410 for a period of time (x-axis 420). Amplitude is shown on the y-axis (430). The exemplary received signal 410 includes interferometer output for a single interferometer 117 but a received signal 410 in a distributed acoustic sensor system 100 that includes more interferometers 117 will include more interferometer outputs. A Fourier transform is taken of the received signal 410 to provide the signal 510 in the frequency domain (x-axis 520). The component 530, as well as portions of the signal 510, are generated because of non-linear characteristics of the tunable laser 120. If the interferometer output resulted from a tunable laser 120 with linear tuning characteristics, the component 530 (and contributions to the signal 510) would not be present. As noted with regard to FIG. 4, a distributed acoustic sensor system 100 with two or more interferometers 117 would receive two or more interferometer outputs and, thus, would include two or more signals 510 in the frequency domain.

Figure 6:
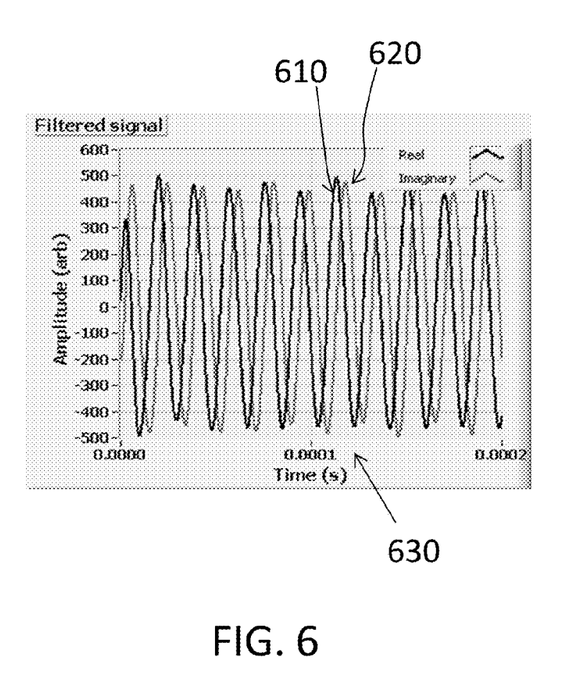
Figure 7:
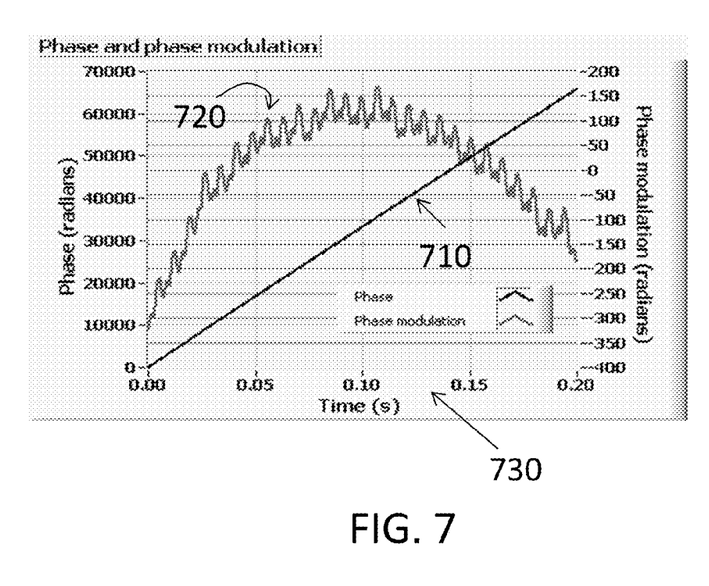

A bandpass filter is used to isolate each of the signals 510, and then an inverse Fourier transform is taken of each isolated signal 510 to provide the exemplary complex signal (real component 610 and imaginary component 620) in the time domain (x-axis 630) shown in FIG. 6. To be clear, when more than one interferometer 117 is used by the distributed acoustic sensor system 100, more than one bandpass filter would be needed, and the processing discussed with reference to FIGS. 7 and 8 would be done for outputs of each of the interferometers 117. By taking the arc tangent of (the real component 610/the imaginary component 620) and then performing phase unwrapping on the resulting phase, the phase 710 and phase modulation 720 over time (x-axis 730) result, as shown in FIG. 7. The phase modulation 720, which is the portion of interest, reflects the contribution of the downhole parameter of interest (e.g., vibration, flow) to interferometer output and also the contribution of the tunable laser 120 when the tunable laser 120 does not have a linear tuning characteristic. Thus, if there were no vibration, flow, or other contribution to the interferometer output and the tunable laser 120 had linear tuning characteristics, the phase modulation 720 would be a flat line at 0. As noted above, the portion of interest is the phase modulation 720 because it includes the vibration or flow contribution to the interferometer output.

Figure 8:
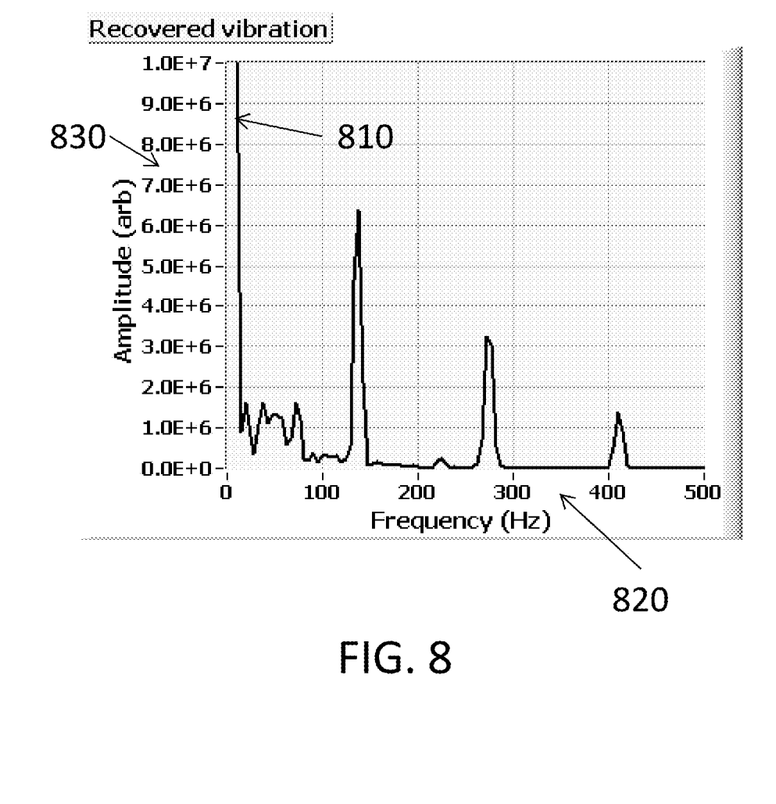

By performing a Fourier transform on the phase modulation 720, the frequency (x-axis 820) and amplitude (y-axis 830) (shown on a log scale) of the vibration may be determined. In the exemplary case discussed with reference to FIGS. 4-8, the interferometer output includes a vibration component induced at 137 Hz. FIG. 8 shows this component 810 at 137 Hz. By monitoring this output over time, changes in frequency and/or amplitude of vibration may be used to determine the condition of machinery (in the embodiment discussed with reference to FIG. 2) or the initiation, increase, or decrease of flow (in the embodiment discussed with reference to FIG. 3). In addition, the phase modulation 720 (indicating vibration or flow) can be localized within the borehole 1 in the following way. As noted above, when more than one interferometer 117 is used, the results shown in FIGS. 7 and 8 are determined for each of the interferometers 117. Thus, by noting which interferometer 117 output shows the vibration component (810), the location of flow, for example, can be determined based on the location of the point reflectors 115 that make up the particular interferometer 117. Embodiments of the distributed acoustic sensor system 100 discussed below include additional types of interferometers 117 and discuss additional methods of determining the location of the interferometer 117. In alternate embodiments, the distributed acoustic sensor system 100 discussed herein may be used for vertical seismic profiling or fracing in addition to vibration and flow monitoring.

Figure 9:
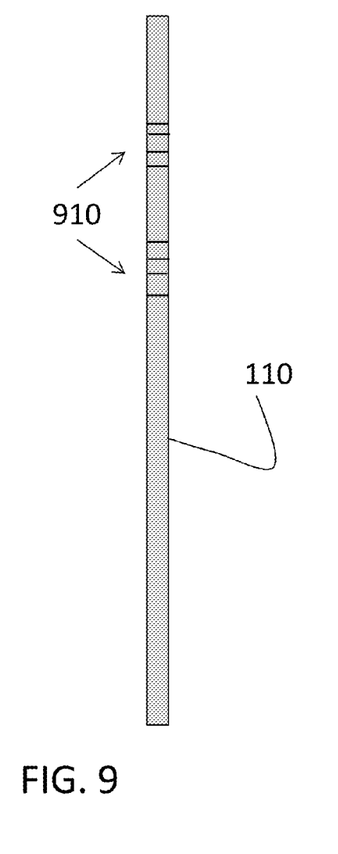
FIG. 9 depicts another embodiment of the distributed acoustic sensor system using fiber Bragg gratings (FBGs)

FIG. 9 depicts another embodiment of the distributed acoustic sensor system 100 using fiber Bragg gratings (FBGs) 910. In this embodiment, FBGs 910 rather than point reflectors 115 are used for the interferometer 117. The FBGs 910 act as reflectors around the resonant wavelength of the Bragg grating. The number and distribution of the Bragg gratings may be varied to affect the reflective characteristic. As with the point reflectors 115, the interferometer signal generated by the FBGs 910 is processed to isolate the phase perturbation caused by the target disturbance (e.g., vibration of machinery 210, flow through sandscreen 310).

Figure 10:
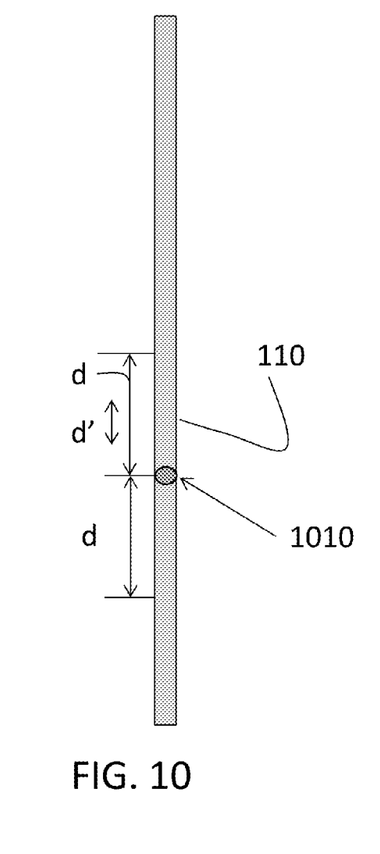
FIG. 10 depicts another embodiment of the distributed acoustic sensor system using Rayleigh backscatter.

FIG. 10 depicts another embodiment of the distributed acoustic sensor system 100 using Rayleigh backscatter. This embodiment is based on the fact that, even without any reflector or Bragg grating along the optical fiber 110, Rayleigh backscatter is generated at every point along the optical fiber 110. With a reference reflector 1010 at a known location along the optical fiber 110, each point on the optical fiber 110 acts as an interferometer 117 in conjunction with the reference reflector 1010. By isolating a length of optical fiber (d') within a certain distance (2*d) around the reference reflector 1010, an area of interest (e.g., part of a machinery 210, sandscreen 310) may be isolated for processing of the interferometer signal. For example, a 20 cm spacing within 500 m of the reference reflector 1010 may be isolated. The interferometer signal generated by the Rayleigh backscatter from the isolated length and the reference reflector 1010 may then be processed to determine the phase modulation. As discussed with reference to FIGS. 2 and 3, the phase modulation (processed as discussed with reference to FIGS. 4-8) indicates the vibration in the case of the area of interest being part of a machinery 210 (like a submersible pump) or flow in the case of the area of interest being part of a sandscreen 310. As shown, the reference reflector 1010 is a point reflector 115. In other embodiments, the reference reflector 1010 may be an FBG 910.

A reference reflector may be used in conjunction with the point reflectors 115 or FBGs 910 discussed with reference to FIGS. 2, 3, and 6, as well. That is, when more than two point reflectors 115 or FBGs 910 are used, the spacing between adjacent point reflectors 115 or FBGs 910 is varied so that a given pair of the point reflectors 115 or FBGs 910 has a unique distance between them and is thereby distinguishable from any other pair along the optical fiber 110. However, to determine where along the optical fiber 110 a given pair of point reflectors 115 or FBGs 910 is located, the point reflectors 115 or FBGs 910 may be placed at known locations (a priori knowledge) or a reference reflector 1010 may be used to make the determination.

Figure 11:
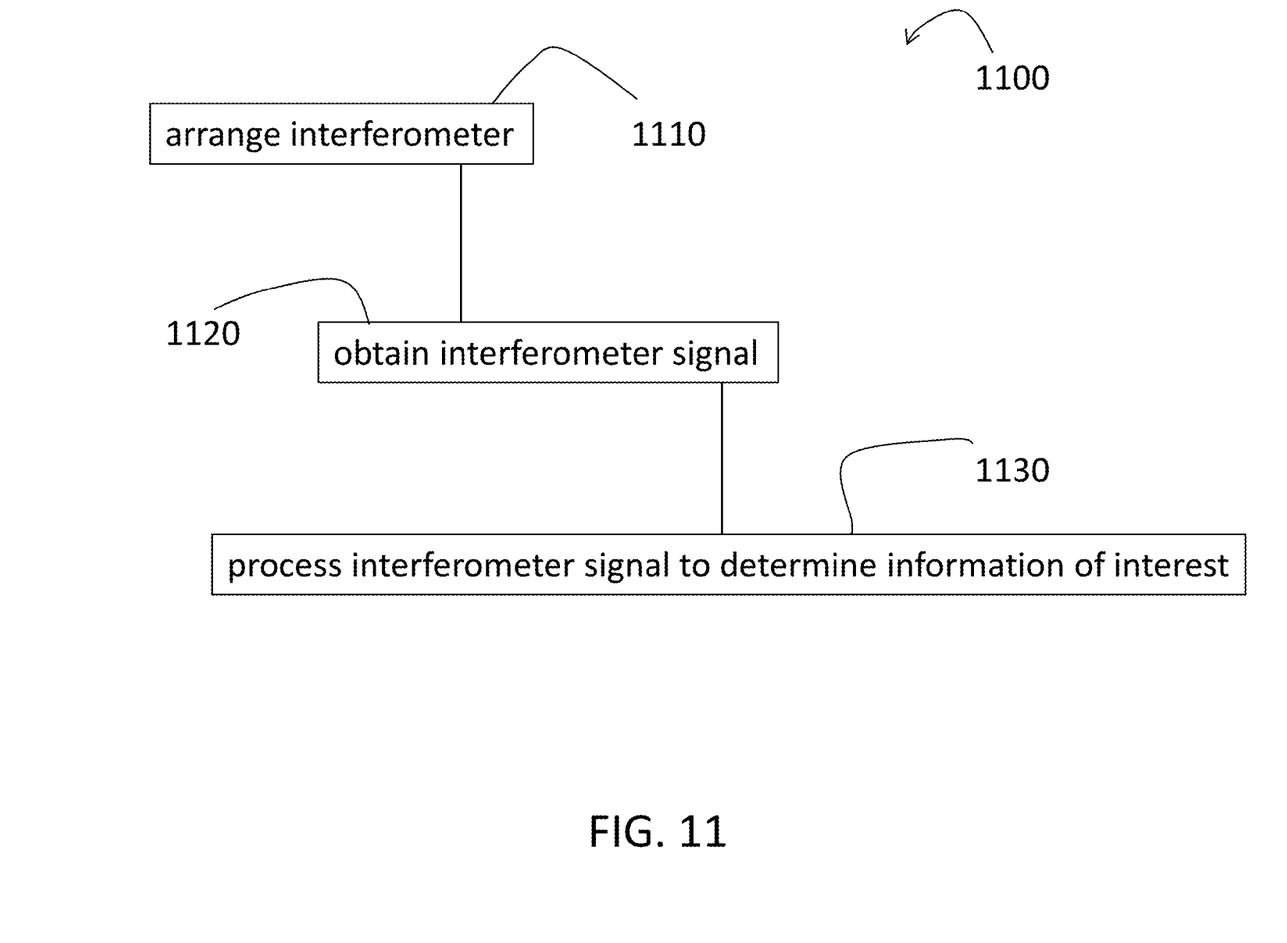
FIG. 11 is a flow diagram of an exemplary method of using distributed downhole acoustic sensing.

FIG. 11 is a flow diagram of an exemplary method 1100 of using distributed downhole acoustic sensing. At block 1110, arranging the interferometer includes arranging point reflectors 115 as discussed with reference to FIGS. 2 and 3 or FBGs 910, as discussed with reference to FIG. 9, with or without a reference reflector 1010, or only including a reference reflector 1010 as discussed with reference to FIG. 10. At 1120, obtaining the interferometer signal includes transmitting a range of wavelengths with a tunable laser 120 and receiving the interferometer signal. The interferometer signal may be received at the surface. At block 1130, processing the interferometer signal to determine the information of interest includes determining the vibration and, over time, monitoring changes in vibrations of a part of a machinery 210 such as a submersible pump. Processing at block 1130 also includes determining flow at location of a sandscreen 310. Processing at block 1130 also includes performing vertical seismic profiling or fracing. The processing at block 1130 may be in accordance with the discussion above with reference to FIGS. 4-8.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A system to perform distributed downhole acoustic sensing in a borehole, the system comprising:
   an optical fiber comprising at least one reflector;
   a tunable laser configured to perform an initial transmission of a range of wavelengths through the optical fiber over a time interval, the initial transmission resulting in an initial interferometer signal that is a sine wave, and additional transmissions of the range of wavelengths, the additional transmissions resulting in interferometer signals;
   a receiver configured to receive the interferometer signals resulting from the additional transmissions; and
   a processor configured to determine phase modulation of the sine wave based on the interferometer signals.

2. The system according to claim 1, wherein the at least one reflector includes a reference reflector, and the interferometer signals are generated by reflections from a point on the optical fiber and the reference reflector.

3. The system according to claim 1, wherein the optical fiber is coupled to a sandscreen, and the phase modulation determined from the interferometer signals indicates flow through the sandscreen.

4. The system according to claim 1, wherein the phase modulation determined from the interferometer signals is used to perform vertical seismic profiling.

5. The system according to claim 1, wherein the at least one reflector is comprised of at least two point reflectors, and the interferometer signals are generated by interference between reflections of two of the at least two point reflectors.

6. The system according to claim 5, wherein the optical fiber further comprises a reference reflector.

7. The system according to claim 1, wherein the at least one reflector is comprised of fiber Bragg gratings (FBGs), and the interferometer signals are generated by interference between reflections of two of the FBGs.

8. The system according to claim 7, wherein the optical fiber further comprises a reference reflector.

9. The system according to claim 1, wherein the optical fiber is coupled to a portion of machinery, and a determination of vibration of the portion is based on the phase modulation determined from the interferometer signals.

10. The system according to claim 9, wherein the machinery is a submersible pump.

11. A method of performing distributed downhole acoustic sensing in a borehole, the method comprising:
    arranging an interferometer in the borehole, the interferometer coupled to a component of interest;
    obtaining an initial interferometer signal from the interferometer based on an initial transmission of a range of wavelengths through an optical fiber over a time interval using a tunable laser, the initial interferometer signal being a sine wave;
    obtaining interferometer signals from the interferometer based on additional transmissions of the range of wavelengths using the tunable laser; and
    processing the interferometer signals to determine phase modulation of the sine wave, the phase modulation indicating information regarding the component of interest.

12. The method according to claim 11, wherein the arranging the interferometer includes arranging a reference reflector along an optical fiber, the reference reflector acting as an interferometer in conjunction with point on the optical fiber.

13. The method according to claim 11, wherein the component of interest is a portion of a machinery, and the information includes vibration of the portion of the machinery.

14. The method according to claim 11, wherein the component of interest is a sandscreen, and the information includes flow through the sandscreen.

15. The method according to claim 11, wherein the processing is used to perform vertical seismic profiling.

16. The method according to claim 11, wherein the arranging the interferometer includes arranging at least two point reflectors along an optical fiber.

17. The method according to claim 16, further comprising arranging a reference reflector along the optical fiber.

18. The method according to claim 11, wherein the arranging the interferometer includes arranging at least two fiber Bragg gratings (FBGs) along an optical fiber.

19. The method according to claim 18, further comprising arranging a reference reflector along the optical fiber.

\* \* \* \* \*